United States Patent
Mason et al.

(10) Patent No.: US 11,588,783 B2
(45) Date of Patent: Feb. 21, 2023

(54) TECHNIQUES FOR IMPLEMENTING IPV6-BASED DISTRIBUTED STORAGE SPACE

(71) Applicant: CISCO TECHNOLOGY, INC., San Jose, CA (US)

(72) Inventors: Seth Mason, San Jose, CA (US); William Mark Townsley, Paris (FR); Andre Surcouf, Saint Leu la Foret (FR); Thierry Gruszka, Paris (FR); Mohammed Hawari, Guebwiller (FR)

(73) Assignee: Cisco Technology, Inc., San Jose, CA (US)

( * ) Notice: Subject to any disclaimer, the term of this patent is extended or adjusted under 35 U.S.C. 154(b) by 891 days.

(21) Appl. No.: 15/075,163

(22) Filed: Mar. 20, 2016

(65) Prior Publication Data

US 2016/0366094 A1 Dec. 15, 2016

Related U.S. Application Data

(60) Provisional application No. 62/173,854, filed on Jun. 10, 2015.

(51) Int. Cl.
*G06F 15/173* (2006.01)
*H04L 61/5038* (2022.01)
(Continued)

(52) U.S. Cl.
CPC .......... *H04L 61/5038* (2022.05); *G06F 3/061* (2013.01); *G06F 3/067* (2013.01);
(Continued)

(58) Field of Classification Search
CPC ........ G06F 3/061; G06F 3/067; G06F 3/0659; H04L 67/1097
(Continued)

(56) References Cited

U.S. PATENT DOCUMENTS

| 4,688,695 A | 8/1987 | Hirohata |
| 5,263,003 A | 11/1993 | Cowles et al. |

(Continued)

FOREIGN PATENT DOCUMENTS

| EP | 2228719 | 9/2010 |
| EP | 2439637 | 4/2012 |

(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.

(Continued)

*Primary Examiner* — Thuong Nguyen
(74) *Attorney, Agent, or Firm* — Polsinelli

(57) ABSTRACT

A method is provided in one example embodiment and includes, for each of a plurality of individual storage units collectively comprising a virtual storage unit, mapping an internal address of the storage unit to a unique IP address, wherein each of the storage units comprises a block of storage on one of a plurality of physical storage devices and wherein the IP address includes a virtual storage unit number identifying the virtual storage unit; receiving from a client a request to perform an operation on at least one of the data storage units, wherein the request identifies the internal address of the at least one of the data storage units; translating the internal address of the at least one of the data storage unit to the unique IP address of the at least one of the data storage units; and performing the requested operation on the at least one of the data storage units.

20 Claims, 7 Drawing Sheets

(51) Int. Cl.
  *G06F 3/06* (2006.01)
  *H04L 67/1097* (2022.01)
  *H04L 101/604* (2022.01)
  *H04L 101/659* (2022.01)

(52) U.S. Cl.
  CPC ........ *G06F 3/0659* (2013.01); *H04L 67/1097* (2013.01); *H04L 2101/604* (2022.05); *H04L 2101/659* (2022.05)

(58) Field of Classification Search
  USPC ....... 709/223, 215, 245, 238, 214, 203, 226; 711/5, 103, 118, 154, 6, 147; 370/389
  See application file for complete search history.

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,096,341 B1 * | 8/2006 | DeTar, Jr. ............... G06F 3/061 711/210 |
| 7,108,339 B2 | 9/2006 | Berger |
| 7,149,858 B1 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 | 7/2008 | Marinelli et al. |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 * | 3/2009 | Banga ..................... H04L 29/06 709/214 |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 | 12/2009 | Kaiser et al. |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |

(56) References Cited

U.S. PATENT DOCUMENTS

| | | |
|---|---|---|
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lager-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1* | 2/2017 | Dhoolam .............. G06F 11/201 |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1* | 7/2004 | Roskind .............. H04L 63/0272 726/16 |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |

(56) References Cited

U.S. PATENT DOCUMENTS

| | | |
|---|---|---|
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0022087 A1* | 1/2007 | Bahar .................. G06F 9/5011 |
| 2007/0067593 A1 | 3/2007 | Satoyama et al. |
| 2007/0079068 A1 | 4/2007 | Draggon |
| 2007/0091903 A1 | 4/2007 | Atkinson |
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0126844 A1* | 5/2008 | Morita ................ G06F 11/1662 |
| | | 714/6.22 |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0241807 A1* | 9/2010 | Wu ..................... G06F 12/0862 |
| | | 711/118 |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1 | 6/2012 | Tokusho et al. |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0061111 A1* | 3/2013 | Sarcone ................. G06F 11/10 |
| | | 714/758 |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |

(56) References Cited

U.S. PATENT DOCUMENTS

| | | |
|---|---|---|
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0297855 A1* | 11/2013 | Gupta .................. G06F 3/0656 711/103 |
| 2013/0304970 A1* | 11/2013 | Parizi .................. G06F 3/0619 711/103 |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215119 A1* | 7/2014 | Fujii .................. G06F 3/06 711/5 |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229482 A1* | 8/2014 | Milenova .................. G06F 16/21 707/737 |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1* | 12/2014 | Khan .................. H04L 45/74 370/392 |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0113223 A1* | 4/2015 | Brown .................. G06F 12/023 711/133 |
| 2015/0120907 A1 | 4/2015 | Niestemski et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1* | 1/2016 | Lakshman .................. G06F 11/2058 714/6.23 |
| 2016/0011936 A1 | 1/2016 | Luby |
| 2016/0011942 A1 | 1/2016 | Golbourn et al. |
| 2016/0054922 A1 | 2/2016 | Awasthi et al. |
| 2016/0062820 A1 | 3/2016 | Jones et al. |
| 2016/0070652 A1 | 3/2016 | Sundararaman |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1* | 4/2016 | Semke .................. H04L 67/1097 709/217 |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1 | 8/2016 | Lewis et al. |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1* | 12/2016 | Mason .................. H04L 61/2038 |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1* | 9/2017 | Park .................. H04W 52/0209 |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1 | 4/2018 | Wright et al. |

FOREIGN PATENT DOCUMENTS

| | | |
|---|---|---|
| EP | 2680155 | 1/2014 |
| GB | 2350028 | 5/2001 |

(56) References Cited

FOREIGN PATENT DOCUMENTS

| JP | 2000-242434 | 9/2000 |
|---|---|---|
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.
Author Unknown, "Coraid EtherCloud, Software-Defined Storage with Scale-Out Infrastructure," Solution Brief, 2013, 2 pages, Coraid, Redwood City, California, U.S.A.
Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.
Author Unknown, "Creating Performance-based SAN SLAs Using Finisar's NetWisdom" May 2006, 7 pages, Finisar Corporation, Sunnyvale, California, U.S.A.
Author Unknown, "Data Center, Metro Cloud Connectivity: Integrated Metro SAN Connectivity in 16 Gbps Switches," Brocade Communication Systems, Inc., Apr. 2011, 14 pages.
Author Unknown, "Data Center, SAN Fabric Administration Best Practices Guide, Support Perspective," Brocade Communication Systems, Inc., May 2013, 21 pages.
Author Unknown, "delphi—Save a CRC value in a file, without altering the actual CRC Checksum?" Stack Overflow, stackoverflow.com, Dec. 23, 2011, XP055130879, 3 pages http://stackoverflow.com/questions/8608219/save-a-crc-value-in-a-file-wihout-altering-the-actual-crc-checksum.
Author Unknown, "EMC Unisphere: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer," Enabling Confidence in Application Performance Before Deployment, 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks An Introduction," White Paper, Doc# 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Infrastructure for the Cloud," Solution Brief, © 2012, 3 pages; coraid, Redwood City, California, U.S.A.

Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "Vblock Solution for SAP: Simplified Provisioning for Operation Efficiency," VCE White Paper, VCE—The Virtual Computing Environment Company, Aug. 2011, 11 pages.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Datasheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," 13th USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference

(56) References Cited

OTHER PUBLICATIONS on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, $EMC^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology Of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach To Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23,-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, AO, et al., "RAIDShield: Characterizing, Monitoring, and Proactively Protecting Against Disk Failures," FAST '15, $13^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.
McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, $5^{th}$ USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.

Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: $5^{th}$ USENIX Conference on File And Storage Technologies, Feb. 13-16, 2007, 16 pages, San Jose, California, U.S.A.
Shue, David, et al., "Performance Isolation and Fairness for Multi-Tenant Cloud Storage," USENIX Association, $10^{th}$ USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "Ceph: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentations/30Wu.pdf.
Xue, Chendi, et al. "A Standard framework for Ceph performance profiling with latency breakdown," Ceph, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology Of China, 2012, 12 pages.
Aweya, James, et al., "Multi-level active queue management with dynamic thresholds," Elsevier, Computer Communications 25 (2002) pp. 756-771.
Petersen, Chris, "Introducing Lightning: A flexible NVMe JBOF," Mar. 9, 2016, 6 pages.
Stamey, John, et al., "Client-Side Dynamic Metadata in Web 2.0," SIGDOC '07, Oct. 22-24, 2007, pp. 155-161.

\* cited by examiner

TECHNIQUES FOR IMPLEMENTING IPV6-BASED DISTRIBUTED STORAGE SPACE

CROSS-REFERENCE TO RELATED APPLICATION

This application claims the benefit of priority under 35 U.S.C. § 119(e) to U.S. Provisional Application Ser. No. 62/173,854, entitled "APPARATUS, SYSTEM, AND METHOD FOR MAPPING IMPLEMENTING IPV6 BASED STORAGE SYSTEM AND FOR SUPPORTING GIGANTIC AND DISTRIBUTED STORAGE SPACE," filed Jun. 10, 2015, which is hereby incorporated by reference in its entirety.

TECHNICAL FIELD

This disclosure relates in general to the field of communications and, more particularly, to implementing IPv6 based storage systems and for supporting gigantic and distributed storage space.

BACKGROUND

The estimated total amount of digital data generated in 2013 was approximately 3.5 zettabytes (3.5 billion terabytes). By 2020, it is estimated that the world will generate 40 zettabytes of data annually; roughly the equivalent of one million photographs or 1500 High Definition ("HD") movies, for every single person on the planet. Existing storage systems utilize collections of local storage devices (e.g., disks) that may be grouped in different arrangements to create, for example, RAID configurations. This technique has worked relatively well, but while the various arrangements of local storage devices differ in detail, they share a number of deficiencies. These deficiencies are due primarily to a reliance on hardware storage devices, resulting in a number of limitations and technical tradeoffs that render such systems non-optimal for creating massively distributed gigantic storage units.

In particular, multi-disk configurations rely on local physical storage devices combined with controllers and servers. Currently, individual disk size is limited to 10 TB; grouping many disks together in the same place is good for maintaining good performance but results in concerns regarding availability. Additionally, multi-disk hardware controllers are limited in both capacity as well as in the number of hard disks that may be connected to them. Other limitations result from the fact that the need for sophisticated replication strategies to provide high data resiliency and availability and server load scaling leads to the deployment of custom, heavyweight approaches. Moreover, partly due to the complexity of their management, data storage systems are usually located in fairly centralized locations in the network, such as data centers, such that the majority of data traffic originates from this limited number of locations. Finally, bringing in any significant additional data storage usually requires repackaging of the whole system in a format adapted to the new data storage system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes, for each of a plurality of individual storage units collectively comprising a virtual storage unit, mapping an internal address of the storage unit to a unique IP address, wherein each of the storage units comprises a block of storage on one of a plurality of physical storage devices and wherein the IP address includes a virtual storage unit number identifying the virtual storage unit; receiving from a client a request to perform an operation on at least one of the data storage units, wherein the request identifies the internal address of the at least one of the data storage units; translating the internal address of the at least one of the data storage unit to the unique IP address of the at least one of the data storage units; and performing the requested operation on the at least one of the data storage units.

Example Embodiments

A purpose of embodiments of the disclosure is to define a method as well as a set of atomic operations for managing massively distributed data storage systems. Another purpose is to create a high-level abstraction on top of distributed data storage, enabling easy control and concealing the underlying complexity. Certain embodiments relate to a distributed storage system far larger than currently available storage systems (e.g., in the range of 1,000 s of zettabytes). Embodiments of the disclosure may leverage IPv6 properties and may be applicable in data center and/or public networks. An embodiment of the disclosure also relates to a new approach for transparently implementing redundancy as well as replication mechanisms. An embodiment of the disclosure further relates to replacing protocols such as iSCSI or HyperSCSI.

The introduction of IPv6 architectures enables revisitation of the myriad design challenges described hereinabove. In particular, the shift from centralized data storage system and single-point access to a massively distributed approach at the inter-networking layer makes possible the design of massive data storage systems. Similarly, the shift from a centralized to a massively distributed approach makes possible the design of more optimal redundant systems. However, utilizing the properties of a modern IPv6 architecture alone to achieve a simpler, higher efficiency, and more scalable data storage system may not simplify the management of the resulting system. Centralized data storage systems, such as Storage Area Network ("SAN") or Network Attached Storage ("NAS"), are relatively easy to manage, whereas managing a truly distributed-in-the-network data storage system of a comparable or even far bigger global size creates many additional problems to solve. An advantage of distributed data systems is that they enable keeping data safe and always available.

Figure 1:
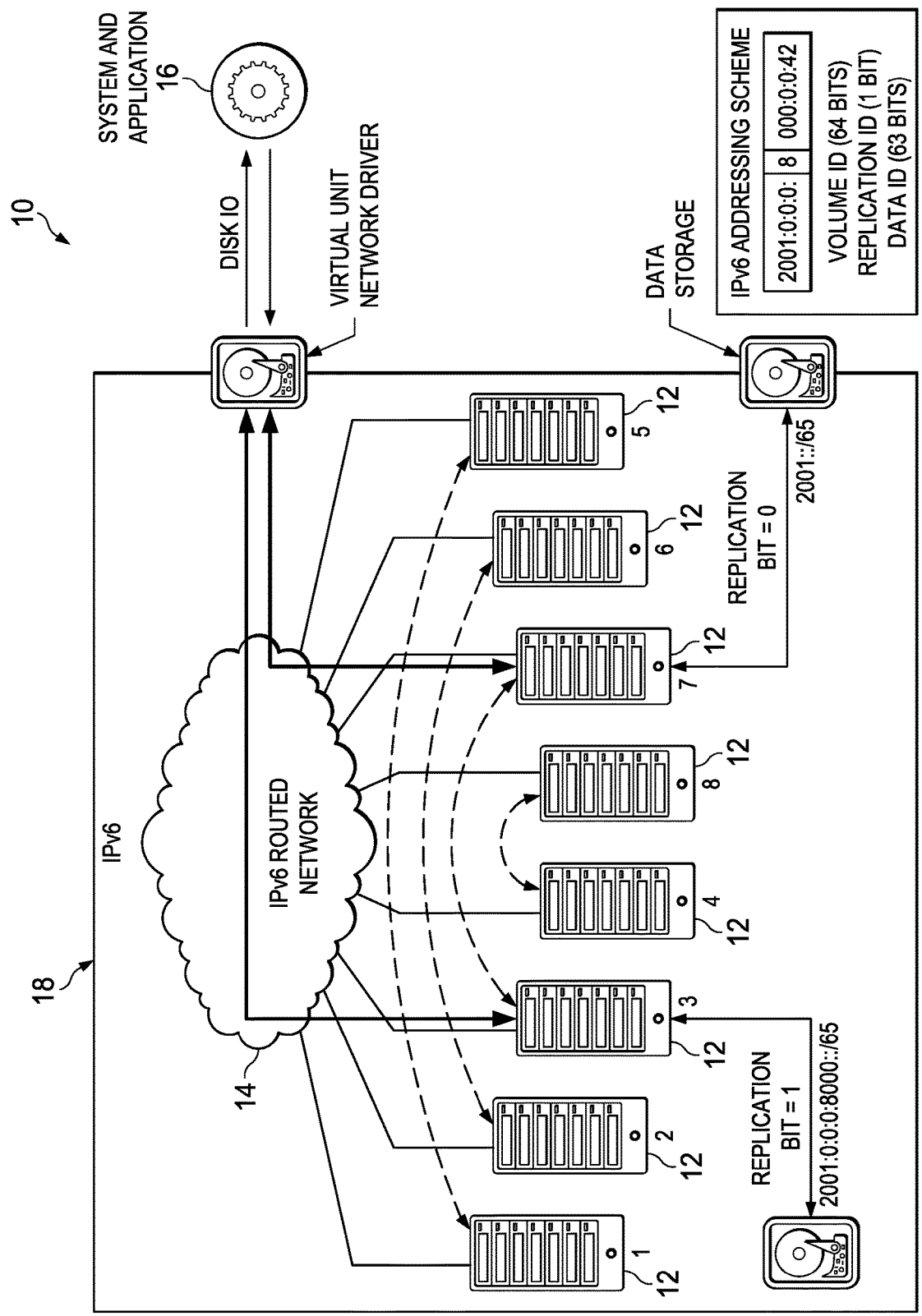
FIG. 1 is a simplified block diagram of a system in which embodiments of an IPv6-based distributed storage space in accordance with features described herein may be implemented.

FIG. 1 is a simplified block diagram of a system 10 in which embodiments of an IPv6-based distributed storage space in accordance with features described herein may be implemented. As shown in FIG. 1, the system 10 includes a number of distributed storage devices 12, which may be implemented as collections of disk drives, interconnected via an IP network 14, which may be implemented as an IPv6 routed network. As will be described in greater detail below, one or more clients, represented in FIG. 1 by a client 16, may access the devices 12 to perform disk I/O operations (e.g., read/write/modify operations) thereon via a distributed storage driver 18, which may be implemented as a virtual unit network driver ("VUND"), and IP network 14. It will be recognized that the IP network 14 may comprise a plurality of nodes, which may be implemented as switches capable of forwarding data through the network 14. It will also be recognized that the client 16 may comprise any hardware or software device capable of initiating I/O operations on the devices 12.

Logical Block Addressing ("LBA") blocks mapping 4 kilobyte ("KB") disk block size have become a de facto industry standard. Assuming a 4 KB block size, the total LBA addressing space is about 75 zettabytes ("ZB"). Building a 75 ZB space with the 10 TB disks currently available would require 750 million disk units.

In one aspect of embodiments for implementing IPv6-based distributed storage space in accordance with features described herein, a 4 KB storage unit is mapped to an IPv6, or simply v6, address. These v6 addresses may be routable or link local addresses, depending on the visibility to be given to the 4 KB storage space. It is assumed that it is possible to either read or write the 4 KB data associated with the v6 address. On a managed network, Maximum Transmission Unit ("MTU") size could also be set to 4 KB, which would allow mapping of a storage unit onto a single packet thus enabling better performances.

In another aspect of embodiments for implementing IPv6-based distributed storage space in accordance with features described herein, it will be recognized that defining a v6 prefix using embodiments described herein is the equivalent of defining a disk in the LBA world. For instance a /64 prefix may be used to define something equivalent to the maximum size that a physical disk could potentially have in the future. As a result, the current physical limitations on disk size may be surpassed and an even bigger storage space may be defined using the embodiments described herein. This aspect may be used to enable creation of virtual disk space of various sizes. In particular, creating a super-giant contiguous storage space might not be the most convenient for certain situations. In such situations, a larger or smaller prefix could be defined. For example, assigning a /56 prefix to storage would allow creation of 16,777,216 storage spaces of 1 Exabyte each. It is therefore easy to define many different contiguous storage spaces each of them having very different sizes.

In certain aspects, the mapping between v6 addresses representing 4 KB addressable storage units and real physical endpoints is neither defined nor dictated by embodiments described herein. A physical device can therefore host several 4 KB storage units, each of which may be accessible through its own v6 address. In yet another aspect, selecting the device containing the requested 4 KB storage unit is managed by a network-forwarding plane. To optionally simplify this aspect, it may be assumed that 4 KB storage units hosted on the same device have consecutive addresses. The 4 KB storage units may therefore be totally distributed across the network and still be seen as a continuous super large LBA-like storage unit. This enables definition of a kind of contiguous address space, which can also be seen as a device local prefix.

Based on the above, the following terms may be defined:

Storage Domain: Storage domain may be defined by a v6 prefix. This prefix could be virtually of any size (e.g., /64 or /56) depending on the targeted applications.

Storage Space: Storage space may be defined by the remaining address bits (e.g. 72 least significant bits ("LSBs")).

Storage Address Space: Storage address space is the list of contiguous v6 addresses from a storage space. By convention, the first address is always StorageSpaceStartAddress-Prefix:0.

Virtual Unit: A storage space is equivalent to very large LBA address space. Each storage space may be divided in smaller units called virtual units. A virtual unit can be defined by a number of most significant bits ("MSBs") from the storage address. For example, 10 bits can be allocated for virtual units numbering. To keep things simple, all virtual units should be the same size. A virtual unit therefore also defines a prefix (e.g. /66) that can be used to address storage units from the particular virtual unit. Having virtual units of different sizes is technically possible, but could lead to wasting addresses, since each v6 address from one storage space can't belong to more than one virtual unit.

Figure 2:
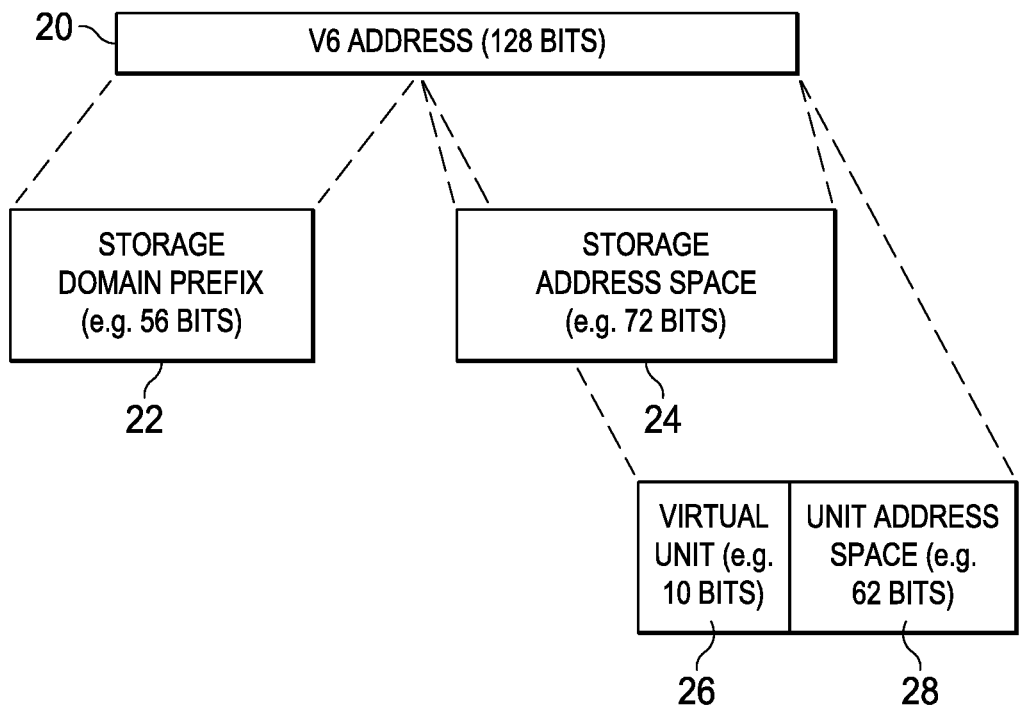
FIG. 2 is a simplified block diagram illustrating storage hierarchy and structure that may be deployed in connection with embodiments of an IPv6-based distributed storage space in accordance with features described herein.

FIG. 2 further illustrates the above-described notions. As shown in FIG. 2, a v6 address 20 is 128 bits and comprises a storage domain prefix (e.g., /56) designated by a reference numeral 22, and a storage address space 24, which in the illustrated embodiment comprises 72 bits. The storage address space 24 further comprises a virtual unit space 26, which in the illustrated embodiment comprises 10 bits, and a unit address space 28, which in the illustrated embodiment comprises the remaining 62 bits.

Based on the foregoing concepts, it is apparent that virtual units are analogous to more conventional hardware disk drives. A virtual unit can be identified as soon as its corresponding prefix is known. In the illustrated embodiment, the virtual unit prefix results from a concatenation of the storage domain prefix and the virtual unit number. As illustrated in FIG. 2, a virtual unit may be defined by its /66 prefix.

The mapping between the unit address space and the physical devices containing the corresponding storage units may be defined by the network topology, thereby enabling the corresponding physical storage to be transparently distributed on several network nodes. A virtual unit is said to be fully accessible as long as any one of its constituents (i.e., the storage units) is accessible. Since a virtual unit may be physically distributed on many physical machines across the network, there is a good chance that at least one of the machines will be down or inaccessible, compromising the accessibility of the entire virtual unit. Based on this notion, it is clear that statistically most of the time a virtual unit will be not accessible.

Alternatively, assuming that a storage device contains several virtual units, it becomes possible to define different RAID or Just a Bunch Of Disks ("JBOD") configurations as is done with real physical HDDs. However, RAID (apart from RAID 0) has been designed to guarantee data accessibility when one or more disks are not accessible or even broken. Because of the distributed nature of virtual units, as described above, on average all disks from the RAID will be inaccessible such that the RAID will not work at all. This raises some issues with regard to virtual unit accessibility. One way to address these issues is to manage replication at the storage unit level and not at the virtual unit level. This may be a built-in feature comparable to what optical disks (CD, DVD, BR, etc.) achieve internally and transparently.

To implement replication at the storage unit level, the m MSBs from the unit address space 18 are used. It may also be possible to use the m LSBs instead, but presumably use of the MSBs provides better storage unit replica distribution across the network based on the assumption that, on average, there is a good chance that a physical machine may host consecutive addresses from the unit address space. Another advantage of this approach is that it maintains the internal unit address space continuous, thus maintaining a direct mapping to the LBA world.

Figure 3:
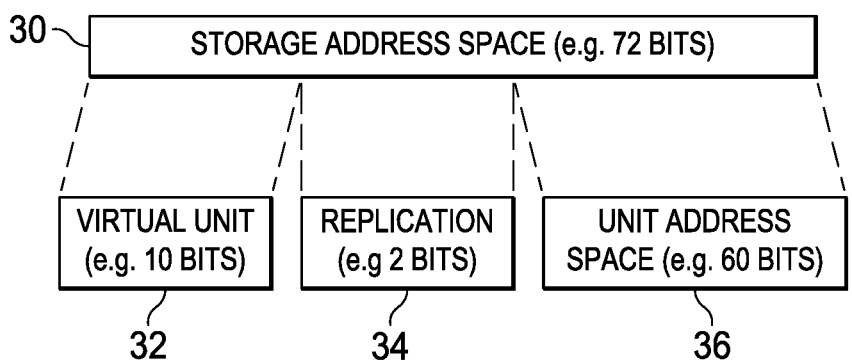
FIG. 3 is a simplified block diagram illustrating a technique for implementing storage unit redundancy that may be deployed in connection with embodiments of an IPv6-based distributed storage space in accordance with features described herein.

Management of storage unit replicas could be performed as a network function and thus be performed transparently to the application. Referring to FIG. 3, in an alternative arrangement, a storage address space 30 comprises a virtual unit number 32, an m-bit replication factor 34, and a unit address space 36. Dedicating m bits to code the replication, or redundancy, factor enables $2^m$ replicas, but also reduces the total unit address space by the same factor.

As a result, two consecutives addresses from the storage address space and belonging to the same virtual unit do not represent two consecutives storage units. However, this is not a problem since, replications bits aside, the internal unit address space is still continuous (but smaller). In other words, a virtual unit contains (or internally supports) some replication mechanism, which can stay hidden to the application as long as the virtual unit exposes a reduced address range.

The fact that replicas of the same storage units are deliberately distributed across the network makes any virtual unit globally eventually consistent, which in turn makes read-modify-write then re-read sequence of disk I/O operations potentially difficult to synchronize. In essence, this is similar to what occurs in a RAID system, in which all replicas must be written before declaring the LBA block finally written. This may be accomplished using a storage unit versioning technique or journaling function to maintain files internal consistency for read and modify operations. In certain embodiments, this may be performed as a virtual unit internal feature.

In some embodiments, the global virtual unit availability depends on several availability of each of these physical devices, the number of replicas for each storage unit, and the network itself. Each of these parameters may be adjusted, depending on the targeted application. Internally replicated virtual units can be combined together to create a RAID system, for example.

The issue of disk partitioning in the context of an IPv6-based distributed storage space in accordance with embodiments described herein will now be addressed. In the conventional LBA world, disks are often split into partitions. Although there are some commonly used standards, the manner in which disk partitions are managed is highly operating system dependent. LBA numbering translation is another common feature disk drivers support. As a result, within a partition the LBA logical address of the first block is always 0. In one case, a partition will be defined by the address of its first storage unit in the unit address space range. Symmetrically adding the partition logical address of any partition storage to the address of the first storage unit of the partition will give the absolute address of the same storage unit within the virtual unit address space. This is very similar to what a classical disk driver does.

The issue of filesystems support in the context of an IPv6-based distributed storage space in accordance with embodiments described herein will now be addressed. Since a virtual unit may be assimilated to a LBA disk (regardless of the management of replicas), a classical filesystem may be implemented by replacing the classical HDD driver by some virtual unit network driver ("VUND"). This enables definition of a number of relevant equivalencies. First, a hard disk drive ("HDD") is equivalent to a virtual unit. Second, an HDD LBA block is equivalent to one address from the unit address space (not including the MSB replications bits), or a storage unit. Since replication can be seen as an internal virtual unit mechanism, any HDD LBA block address will have the replication bits set to a fixed and constant value (e.g. to 0). An HDD LBA block having the address n will have the following v6 equivalent address:
StorageDomainPrefix:VirtualUnit:Replication(0):n
Finally, a storage domain is equivalent to a forest of internally replicated as well as spread across the network HDDs.

In another aspect of an IPv6-based distributed storage space in accordance with embodiments described herein, to maintain compatibility with existing systems, storage unit replicas (when they exist) will remain hidden to the application (e.g., the filesystem). To achieve this, replication bits from the storage unit full v6 address will be artificially set to 0. What happens underneath is implementation-dependent, as detailed below.

Any classical filesystem (Ext4, NTFS, etc.) essentially writes and reads LBA blocks (from 0 to n) within a partition. The disk driver is responsible for translating this partition internal addressing in some LBA addressing on the right disk. Similarly, the VUND translates the partition internal addressing in the corresponding storage unit network addressing. The VUND may also support some RAID configuration at the same time without the application (e.g., the filesystem) even noticing.

Figure 4:
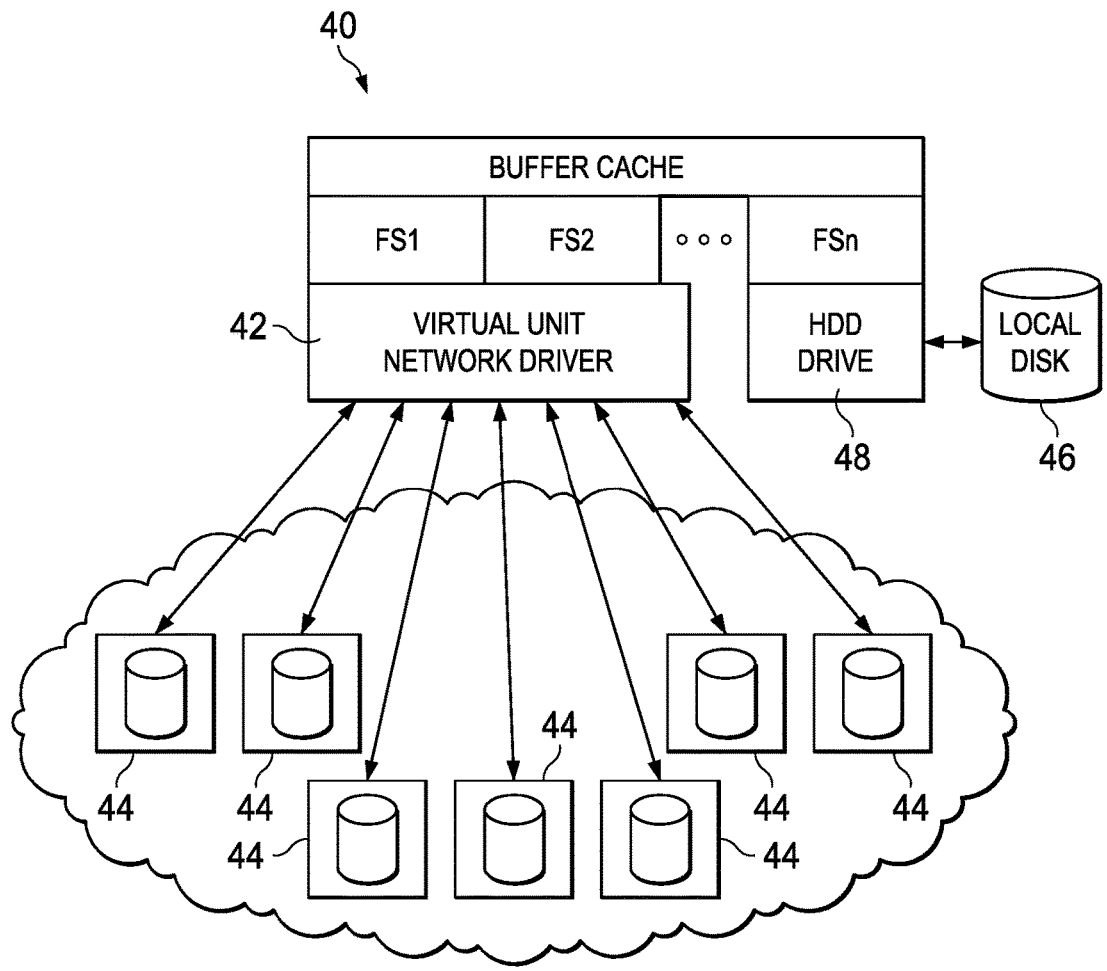
FIG. 4 is another simplified block diagram of a system in which embodiments of an IPv6-based distributed storage space in accordance with features described herein may be implemented.

The VUND will now be addressed in greater detail. FIG. 4 illustrates a "Linux inspired" version of overall resulting hierarchy of a system 40 for implementing an IPv6-based distributed storage space in accordance with embodiments described herein. As shown in FIG. 4, a virtual unit network driver ("VUND") 42 is globally responsible for managing read/write operations of storage units of a plurality of virtual units 44. In particular, the VUND 42 is provided with the following information for each virtual unit 44: storage domain prefix, number of bits coding the virtual unit number, virtual unit number, number of bits coding the replication factor, number of replicas, size of the virtual unit (in number of storage units), and storage unit size (default is 4 KB). Using this information, the VUND 42 may perform read and write operation on any storage unit belonging to any virtual unit 44. The VUND 42 may work in one of two modes, including RAW mode and Disk Compatibility mode. In RAW mode, replicas must be accessed individually and explicitly; that is, the application is responsible for managing the storage unit replication mechanism. In Disk Compatibility mode, the only acceptable value for the replication bit(s) is 0; if the application requests access to another replica (replication bits≠0), the value will be ignored. In Disk Compatibility mode, the VUND 42 internally and transparently manages replicas and performs a role very similar to the one performed by a classical disk driver with few differences. One difference is that the definition (storage domain prefix, virtual unit number, number of replicas, size, etc.) of a virtual unit cannot be read from the disk and must be provided via another mechanism. Additionally, managing storage unit replicas is a VUND responsibility, portioning information (if it exists) may be read from the virtual unit assuming that the virtual unit partitions are managed as disk partitions are, and managing RAID configurations involving several virtual units is also a VUND responsibility.

It will be recognized that, as compared to a local disk drive (e.g., HDD driver 46 connected to local disk 47), certain aspects of the performance of distributed storage may not be optimal for certain applications. The effects may be mitigated by maintaining the machines hosting the storage units in a data center topologically close to the machines running the different filesystem applications (e.g., filesystems FS1-FSn). However in implementations in which the storage units are truly distributed across a wide (potentially public) network, certain applications may be targeted. Such applications are generally those that require large data volume, high data redundancy, high data availability, and simultaneous multi-access, but that do not require complete and instantaneous consistency across replicas or very high I/O throughput.

Embodiments of the disclosure also enable other models in which data needs to be shared between different applications or entities. For instance, embodiments of the disclosure make possible the creation of a super large in-the-network-caching system. The in-the-network characteristic of such a caching system does not mean that the physical caches are physically part of the network gears themselves; rather, that the fact that the whole cache is accessible via v6 addressing makes the actual deployment transparent to the application. Additionally, due to distribution of storage units across the network, it also possible to envisage creation of specific filesystems in which the VUND internally manages a replication management in a transparent manner (Disk Compatibility mode). Additionally, the filesystem may embody characteristics such as encryption of all storage units that contain data, as well as storage of filesystem control structures (inodes, directories, bitmaps, etc.) and file data in different and separated virtual units. Filesystem characteristics may also include that the virtual unit that contains the filesystem control structures may be locally hosted on a fully secured network (e.g., a company LAN); the filesystem control structures may also be encrypted. Finally, the virtual unit containing file data may be outsourced and hosted on servers running in different clouds, for example. Structure may be protected in different data centers. In this manner, user data stored in the filesystem is difficult, if not impossible, to access as long as the filesystem structure can be protected against malicious attacks.

Separating filesystem control structures from file data in different storage units enables data to be fully secured in the file system and render filesystem reverse engineering virtually impossible. This further enables user data to be fully secured in a super large and redundant filesystem without the need to fully secure the whole storage.

Use of the VUND in RAW mode allows revisitation of numerous implementation paradigms. As an example, databases, such as a Cassandra cluster, for example, may benefit from embodiments of the disclosure, since the cluster would become a purely logical view fully independent from the physical implementation. It could also greatly contribute to simplify the implementation of the internal replication mechanism of the Cassandra cluster. Another possible implementation of embodiments of the disclosure may be to implement map reduce framework radically differently. Embodiments of the disclosure can also be used as a replacement for iSCSI protocol, which is commonly used to access a Storage Area Network ("SAN") in data centers. In order to ensure performances comparable to existing SAN, it would make sense to deploy the corresponding storage domain(s) in some physically separated network.

The default 4K storage unit size is employed in embodiments described herein to simplify the compatibility of the disclosed embodiments with existing storage systems; however, it will be recognized that any storage unit size may be utilized. The storage unit size could be a storage domain or virtual unit parameter. In this manner, the total addressable storage size becomes virtually infinite. The ability to define storage units of any size enables the storage unit size to be deemed equal to the filesystem cluster size (e.g. 64 KB for ReFS), which would greatly increase filesystem performances. In one embodiment, the 4K default size is necessary for supporting Disk Compatibility mode described above, but is not necessary for any other type of application. One possible extension to embodiments described herein would be to use a v6/SR approach to implement replicas management.

Embodiments of the disclosure revisit the concept of "network storage" and propose a new implementation of this concept. It is differentiated by, among other things, its capacity to support current size storage space, as well as virtually limitless storage space. Embodiments of the disclosure also revisit the concept of disk, arrays of disks (e.g., RAID), and network area network (e.g., SAN) systems. The embodiments brings a lot of flexibility as well as internal flexible replication mechanism working at the storage unit level. This latter mechanism when controlled by the application also allows revisiting the implementation of new databases (Cassandra) or distributed filesystem (Hadoop) implementations.

Embodiments of the disclosure can also be used to implement almost all existing storage systems as well as the associated applications (filesystems, etc.) but can also support new category of applications, such as big data framework or dedicated database without any storage space limitation. Embodiments of the disclosure leverage the v6 address model and may benefit from additional v6 mechanisms, such as segment routing, to implement some storage management internal features. Embodiments of the disclosure leverage IPv6 patterns to (re)implement all storage (such as disks, RAID, SAN, filesystem) and distributed database paradigms (Cassandra, Hadoop) in a unified network built-in design.

Potential advantages for certain embodiments described herein may, but are not limited to, one or more of the following. Certain embodiments may enable support for super large storage address space at least far bigger than what can be achieved with today technologies. Certain embodiments may offer a natural support for gigantic Berkeley (UFSx) or IBM (GPFS) filesystems. Certain embodiments may support replication at the storage unit that cannot be achieved with classical approaches, such as RAID, which are managing redundancy at HDD level. Certain embodiments enable revisitation of some large modern database implementation as well as other frameworks (e.g. map/reduce). Certain embodiments enable transparent distribution of the physical storage (as well as associated replicas) in different places, thus making the whole storage more resilient to issues such as data center outages, for example. The mapping between the v6 addresses used to access individual storage units and the corresponding physical locations can be defined by the network physical topology and is therefore far more flexible than traditional approaches in which physical locations are dictated by other physical constraints. Additionally, certain embodiments can be seen as more powerful and more flexible alternative to iSCSI protocol.

Embodiments of the disclosure could be used in a variety of implementations including, for example, in data centers to implement large data storage systems; as an infrastructure to support very large exotic filesystems; to protect privacy data when stored in a public cloud or a publicly accessible public storage infrastructure; to implement resilient systems for storing data; and to implement SAN in an alternative manner.

Throughout this disclosure, "virtual disk," "pseudo-disk", and/or "virtual HDD" refer to the equivalent of the LBA address space exposed by classical HDD. The main difference is that physical HDD exposes a limited LBA address range driven by its internal capacity whereas embodiments of the disclosure enables potential extension of the LBA address space beyond 64 bits.

In one approach, scalability derives from the virtual disk itself. Embodiments described herein creates what is equivalent to a single HDD having a capacity of several Exabytes also managing internal as well as transparent 4K pseudo LBA blocks replication mechanism. Rather than representing a piece of a file, each 4K block comprises a "network equivalent" of a classical HDD LBA block. As a consequence of the above, any type of existing filesystem such as ext3, HDFS or even a FAT32 can sit on top this "virtual drive" mechanism without even noticing.

Retrieving content happens in the exact same way it happens for disk attached to a computer, such as a local laptop, except that the SATA disk driver interacts not with a real physical HDD but rather to a collection of servers, each of which is responsible for a subpart of the global virtual disk.

As opposed to conventional approaches, replication is not managed by a filesystem or by a distributed filesystem, such as Hadoop, but is rather managed at the block storage level. One possible technique for implementing the replication mechanism is basically a brute force approach in which each 4K storage block is replicated on different servers. In this technique, the MSBs of the address right after the replication bits can be viewed as a prefix for a replicas family. Consistency is maintained between replicas as follows.

With regard to a WRITE operation, as will be described in greater detail below, a 4K block (or multi-block) write operation is launched on all replicas in parallel. The VUND adds a timestamp alongside the data to write. The WRITE operation is considered complete as soon as at least some (e.g., one, a quorum, or all) of the replicas are updated. Servers hosting replicas of the same block(s) are constantly communicating to keep all replicas up-to-date. In certain embodiments, this is achieved using a variant of GOSSIP. Briefly, if a server hosting a replica misses a write operation because it was down or simply unreachable or because of a time-out, the server will compare its own timestamp to timestamps from other severs. The server or servers hosting the data most recent timestamp wins. With regard to a READ operation, as will also be described in greater detail below, the VUND initiates parallel READ operations on all replicas and selects the one having the most recent timestamp. This mechanism is partially inspired by that employed in connection with optical disks (e.g., CD-ROM, DVD-ROM), in which the same block is replicated in different places on the disk to accommodate the risk of scratches. With four replicas, the probability of inconsistent data (i.e., not being able to read back what has been previously written) is about $10^{-30}$, which is better than what today's physical HDD or RAID can provide.

In distributed filesystem or database approaches, such as Hadoop or Cassandra, latency is highly dependent on the cluster configuration. For instance, on a Cassandra ring of 10 nodes with a replication factor of 4, there are 6 chances out of 10 that the required data is not on the node used to access the data, thereby leading to additional data transfers between nodes to make the data available from the node used by the application for accessing the Cassandra database. In certain embodiments described herein, latency is almost constant since for accessing 4K block(s) pertaining to a file the sequence is always the same:
(local IO operation)→(access storage server(s))→(server(s) access(es) its/their local storage)→(data transfer back to VUND)→(VUND copies data to the filesystem buffer cache)

Operations designated (access storage server(s)) and (data transfer back to VUND) are network transfers for which the latency in a data center is known and almost constant. Embodiments described herein are primarily designed to support applications in which very large storage space is required and where data integrity is key but without the cost of managing data backups. One such application is long-term storage of video assets. This could be used by an origin server to e.g. store all the video chunks (different qualities, etc.) coming out from a video encoding factory. Another such application is document archiving. Yet another such application is re-implementing distributed database designs, such as Cassandra clusters.

Embodiments of the disclosure are also a replacement of the traditional implementation of a disk driver. Briefly, the VUND translates any access to an LBA name space in network accesses in a fully transparent way. The VUND therefore does not "discover" the disk/network; the only thing the driver needs to know is a v6 prefix representing the virtual unit (see FIG. 2), the number of replicas, and the position of the replication bits in the address.

Each server hosting one replica family (e.g. replication bits set to 10) from a subpart of the overall virtual disk can be seen as a prefix (e.g. a /120). As soon as there is a route in the data center for each of those prefixes, the virtual disk is accessible and the VUND just ignores where the servers physically are.

The VUND achieves translation between disk I/O request initiated by a filesystem and requests to IPv6 address representing the disk block(s) by prepending the corresponding prefix. This prefix used for initiating the network communication with the server hosting the requested block also comprises the replications bits. In other words, the northbound VUND interface is a classical disk driver interface and the southbound interface is the v6 IP stack.

Classical disk drivers can initiate a multi-blocks I/O for consecutive LBA blocks. The VUND as well as the distributed storage servers also supports multi-block I/O operations. The only additional complexity is when the requested blocks range crosses server boundaries but this is addressed by the protocol deployed between the VUND and the servers.

The VUND emulates a real disk driver northbound interface, which is never directly used by filesystems as such. For instance, in Linux kernel all disk I/O operations are initiated by the buffer cache, which in turn can be used by several filesystems of different types (POSIX or not). The POSIX semantic is guaranteed by a POSIX compliant filesystem (e.g. EXT3) but this has nothing to do with the underlying storage I/O system. As a result, almost any type of filesystem can sit on top of the distributed storage.

In an alternative embodiment, instead of mapping to an LBA, a storage device presenting a (key,value) pair based API would be used instead. An example of such a device is the Kinetic HDD available from Seagate Technology LLC. The Kinetic HDD has a key size of 4 KB. In the alternative embodiment, the key would be mapped into a v6 prefix. By embedding either the key itself or the prefix of the key into the IPv6 header, routing and policy decisions, as well as how the data should be stored, could be made in transit without having to perform deep packet inspection on the contents of the data itself. For example, multiple packets each with the same source and destination IP addresses could have different key values (A1, B1, C1) and could therefore be treated differently. A #####=Gold, B ####=Silver, C #####=Bronze. Additional security could be implemented by the network such that source X could be forbidden from writing to key values A00000-A99999), or that source Y could only be allowed to write to key values starting with C0000-00025.

In one example, by embedding the key of a (key,value) pair storage system into the IPv6 header, the network could make routing and policy based decisions not otherwise possible with existing data transfer methods. This alternative embodiment could enable M devices writing to N storage end points through the synergy of IPv6 transport with (key,value) pair storage devices. It can enable the network to make intelligent network and storage decisions based upon the IPv6 header. It provides a foundation for how Internet of Things ("IoT") based infrastructure (e.g., parking meters, sensors for which M is a sufficiently large number) can talk directly to the data store without having to traverse a large and costly infrastructure (webservers, load balancers, application servers, storage arrays).

In operation, one possible implementation may include mapping between the unit address space and the physical devices containing the corresponding storage units being defined by the network topology, thereby allowing transparent distribution of the corresponding physical storage on several network nodes.

Figure 5:
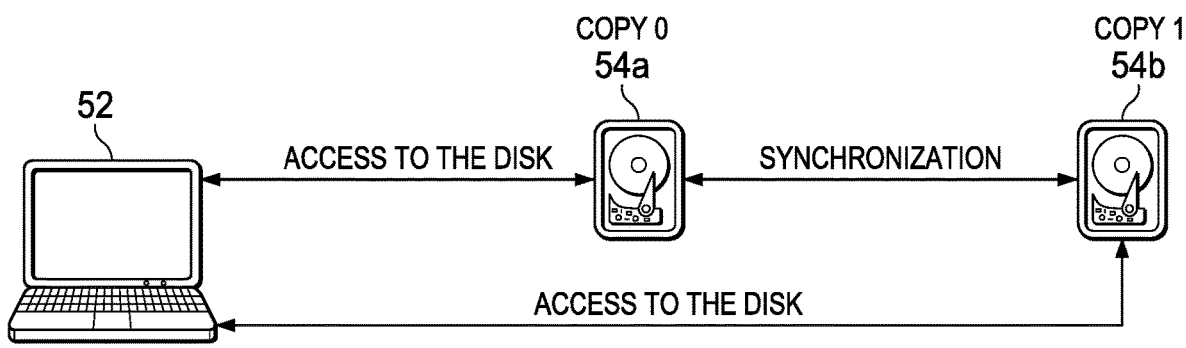
FIG. 5 illustrates protocols that may be deployed in connection with embodiments of an IPv6-based distributed storage space in accordance with features described herein.

Referring now to FIG. 5, two protocols are used to implement replication in accordance with embodiments of IPv6 distributed storage space as described herein. A first protocol ("client-to-server") enables a client 52 to access servers comprising the disk storage 54(a) and 54(b). A second protocol ("server-to-server") is used by one or more servers hosting the disk storage 54(a), 54(b) to manage the replication mechanism. The client-to-server protocol is designed to ensure reliability and accuracy and is built on top of TCP. The server-to-server protocol is designed to ensure consistency between copies and is built on top of UDP.

Figure 6:
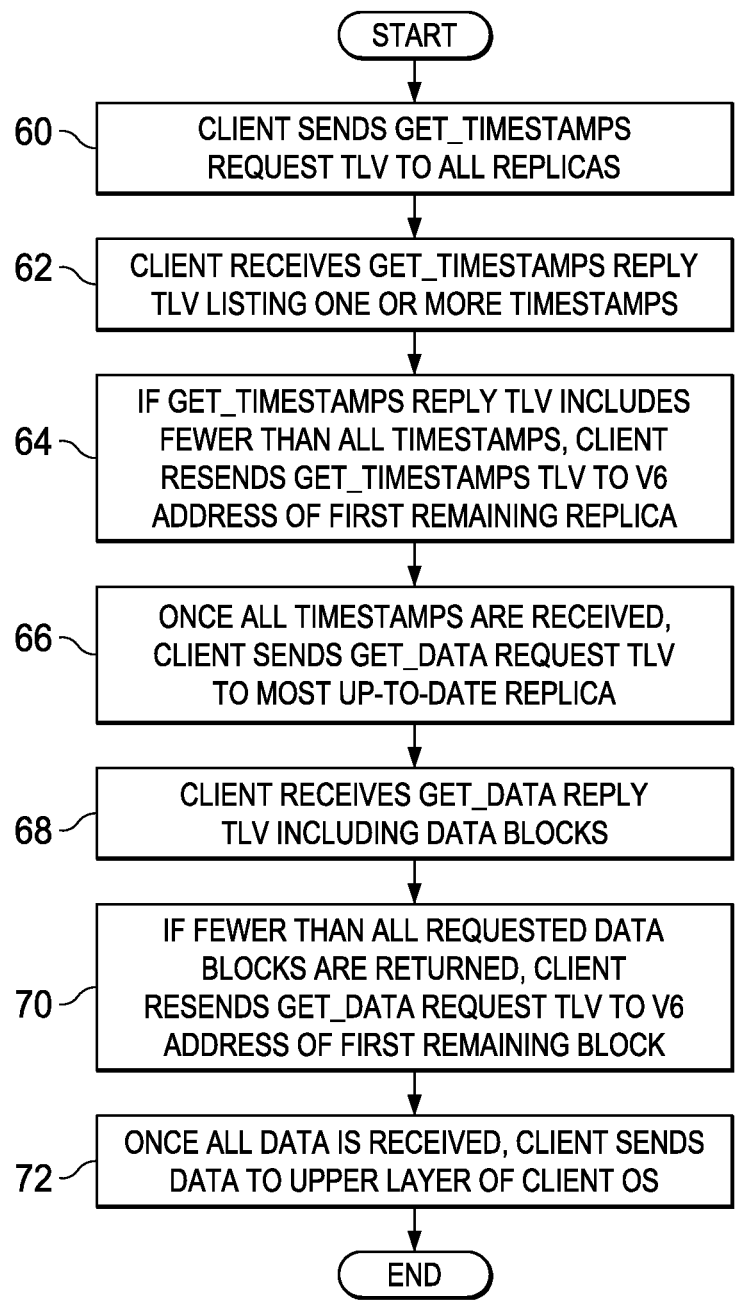
FIG. 6 is a flowchart illustrating a READ operation that may be performed in connection with embodiments of an IPv6-based distributed storage space in accordance with features described herein.
Figure 7A:
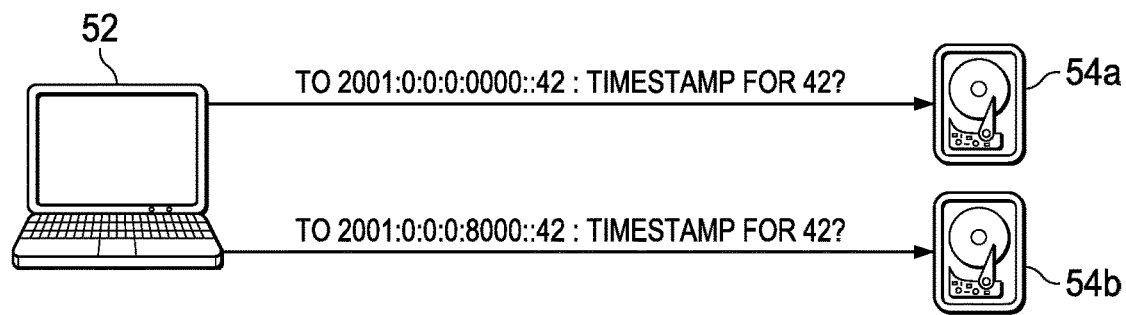
FIGS. 7A-7D are simplified block diagrams further illustrating the READ operation of FIG. 6.
Figure 7B:
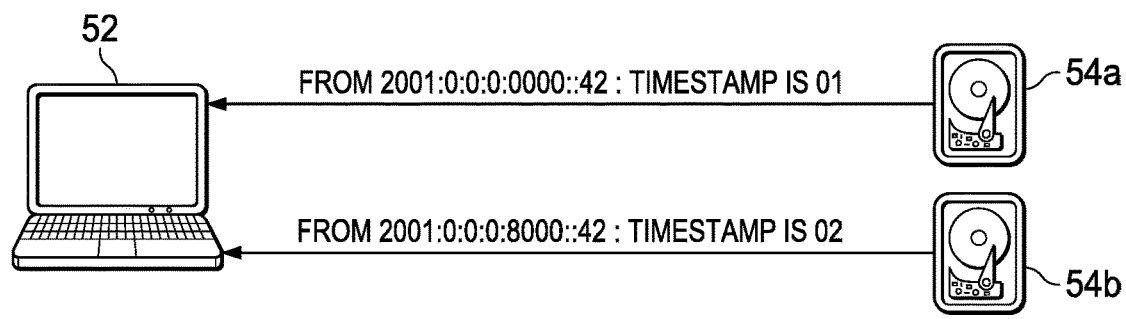

FIG. 6 is a flowchart illustrating steps performed during a READ operation. In step 60, the client sends a GET_TIMESTAMPS request to all of the replicas (FIG. 7A). The GET_TIMESTAMPS request is a TLV that contains the number of requested blocks and is sent to the IPv6 address of the first LBA block plus the number of blocks for multi-blocks operation. In step 62, the client receives a GET_TIMESTAMPS reply (FIG. 7B). The reply is a TLV that contains the number of returned timestamps and the list of all the timestamps (one per virtual LBA block).

Figure 7C:
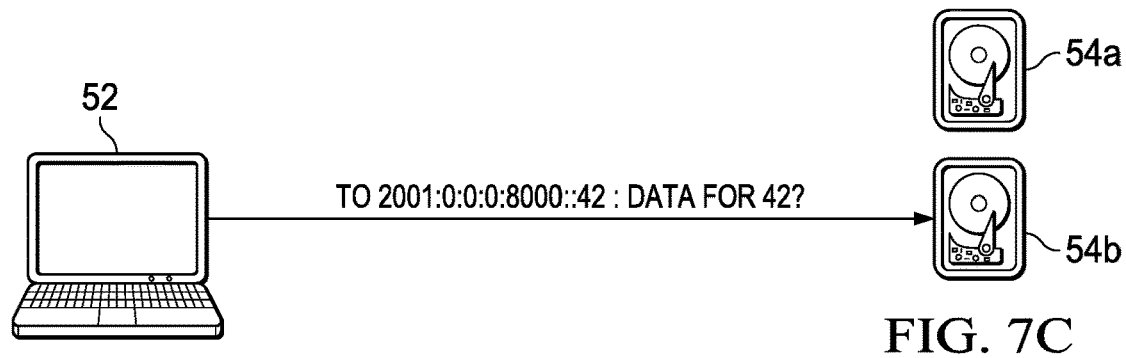
Figure 7D:
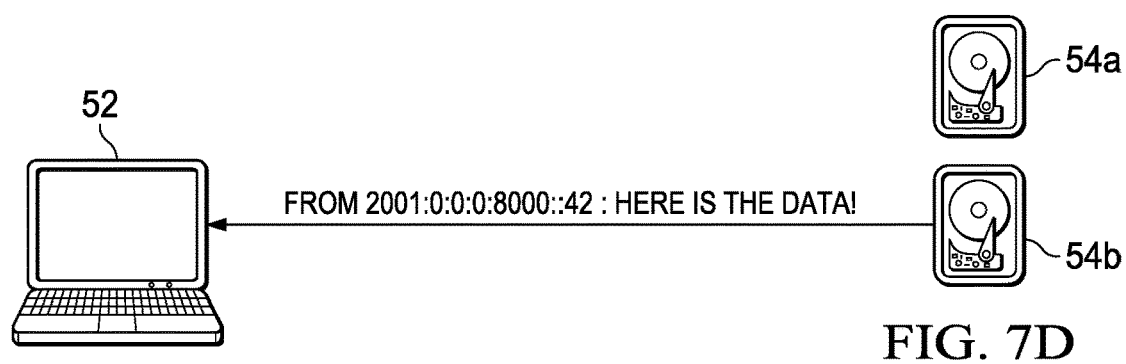

In step 64, if the GET_TIMESTAMPS reply contains fewer timestamps than the requested number of timestamps, the client resends the GET_TIMESTAMPS request for the remaining timestamps to the IPv6 address of the replica of the first remaining timestamp. This happens only when the requested blocks (multi-blocks operation) are not hosted in the same server, meaning that the v6 address range corresponds to more than one server. In step 66, upon receipt of all of the timestamps, the client sends a GET_DATA request to the most up-to-date replica (i.e., the one with the most recent timestamp) (FIG. 7C). The GET_DATA request TLV also contains the number of requested blocks. In step 68, the client receives a GET_DATA reply TLV that contains the number of requested blocks as well as the actual data from the blocks. If the number of returned blocks is less than the number requested, in step 70, the client resends the GET_DATA request to the IPv6 address of the first remaining block. In step 72, the data is delivered to the upper layer in the operating system (FIG. 7D). In certain embodiments, the client may be a filesystem, a database, etc.

Figure 8:
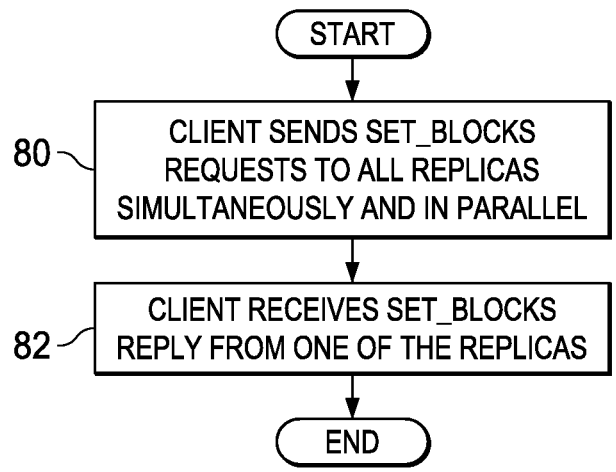
FIG. 8 is a flowchart illustrating a WRITE operation that may be performed in connection with embodiments of an IPv6-based distributed storage space in accordance with features described herein.
Figure 9A:
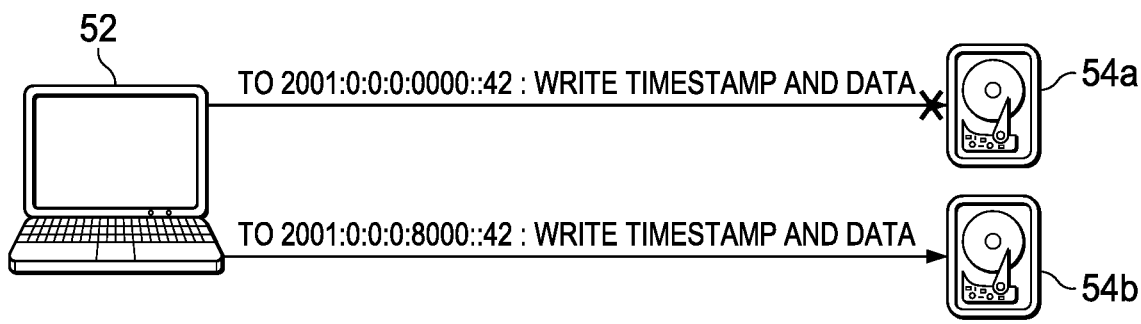
FIGS. 9A-9B are simplified block diagrams further illustrating the WRITE operation of FIG. 8.
Figure 9B:
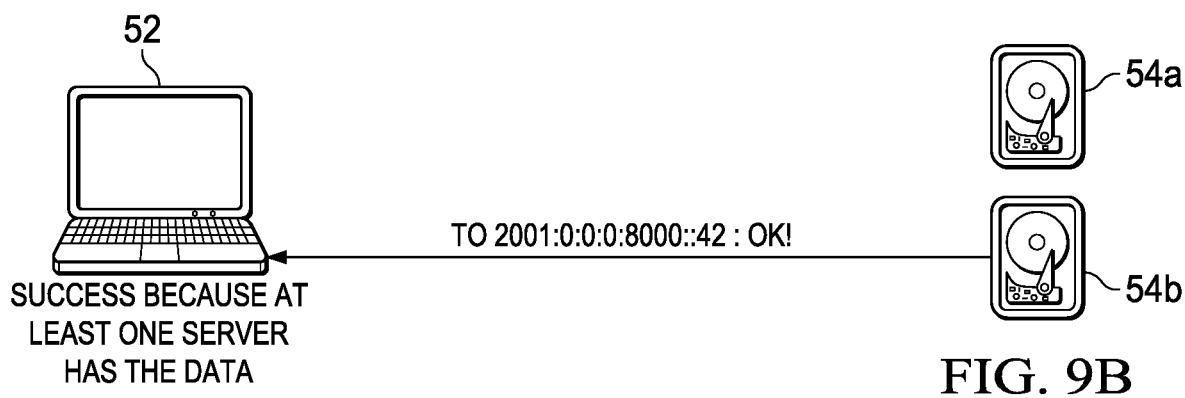

FIG. 8 is a flowchart illustrating steps performed during a WRITE operation. In step 80, SET_BLOCKS request TLVs are simultaneously sent in parallel to all the replicas (FIG. 9A). In step 82, when one of the replicas acknowledges receipt of the SET_BLOCKS request with a SET_BLOCKS reply TLV, the operation is considered successful (FIG. 9B). In certain embodiments, a SET_BLOCKS request contains the number of blocks to write and the list of timestamps and data associated with each block to write. The timestamp itself it created by the client so that all replicas get the same timestamp value. This timestamp represents the time at which the client initiates the WRITE operation. The SET_BLOCKS reply contains the number of written blocks. If the number in the SET_BLOCKS reply is less than the number in the SET_BLOCKS request, in step 84, the client resends the SET_BLOCKS request (with the same timestamp value as the previous request) to the IPv6 address of the first remaining block.

TLV details are as follows:
TYPE: 1 BYTE
LENGTH: 8 BYTES (BE integer)

VALUE: $LENGTH BYTES

For a GET_TIMESTAMPS request TLV, VALUE may be the number #N of requested blocks (8 BYTES, BE integer). For a GET_TIMESTAMPS reply TLV, VALUE may be the number #N of returned blocks (8 BYTES, BE integer)+N*8 BYTES corresponding to the timestamps. For a GET_DATA request TLV, VALUE may be the number #N of requested blocks (8 BYTES, BE integer). For a GET_DATA reply TLV, VALUE may be the number #N of returned blocks (8 BYTES, BE integer)+N*BLOCK_SIZE BYTES corresponding to the data. For a SET_BLOCKS request TLV, VALUE may be the number #N of blocks to write (8 BYTES, BE integer)+N*(8+BLOCK_SIZE) corresponding to the list of (timestamps, data) couples. For a SET_BLOCKS reply TLV, VALUE may be the number #N of blocks actually written (8 BYTES, BE integer).

As previously noted, the protocol for managing the replication mechanism (i.e., the server-to-server protocol) may be implemented on top of UDP. The protocol is geared toward detecting inconsistencies between LBA block replicas stored in two storage nodes. To achieve this, embodiments described herein can detect and track inconsistencies across a large-sized Merkle Tree. The Merkle tree itself is a representation of all LBA blocks hosted in servers. To simplify the design, it is assumed that replicas #n of all blocks hosted in a single server are also hosted in a single server. In other words, if a server hosts N blocks and if the replication factor is 2, then the replicas for these N blocks are also all hosted in one unique server. The same principle applies regardless of the replication factor.

Consequently, if the replication factor is R, there will be R(R−1)/2 running instances of this protocol per group of storage servers. A group of storage servers is the list of storage servers hosting a set of blocks plus their corresponding replicas so if R=4, each group of servers contains four servers, the virtual disk space being itself distributed across several server groups.

Figure 10:
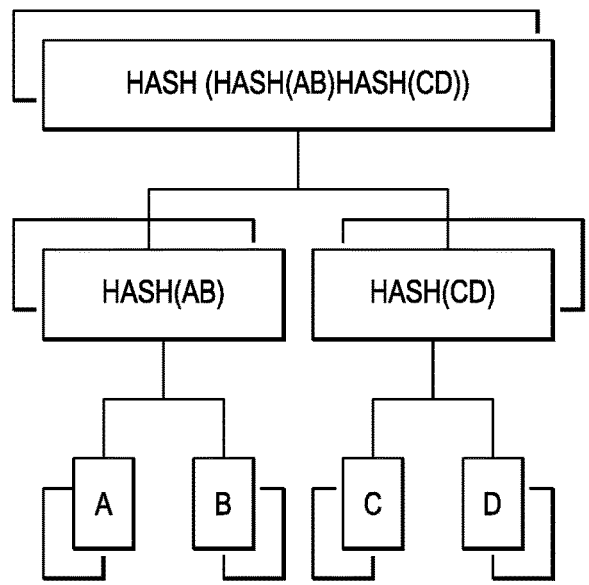
FIG. 10 is a simplified block diagram of a Merkle tree that may be utilized in connection with embodiments of an IPv6-based distributed storage space in accordance with features described herein.

Between two nodes from any given server group, each of the nodes maintains a binary hash tree (Merkle tree) used for synchronization purposes and a table containing cache entries (referred to as "the cache"). Each cache entry consists of a node identifier ("nid") that uniquely identifies a node in the Merkle tree, the corresponding LOCAL hash, a cache entry status identifier (e.g., IDLE, RECOVERY or EXPIRED), and an expiry timer. Referring now to FIG. 10, illustrated therein is a Merkle tree 100. It will be noted that each server maintains a Merkle Tree in memory. Leaves of the tree are the hashes of 4096 contiguous timestamps on the server. In case of consistency, only the top hash needs to be compared.

The cache update routine is as follows. When the update routine is triggered, all the EXPIRED entries are deleted. If there is only a root entry left in the cache, its state is changed to IDLE. All the IDLE entries in the cache are sent to the peer. When a peer node gets a message, each entry in the message that does not correspond to a root node is placed in the cache (if it is not already there). If the received hash is the same as the local one, the entry is marked as EXPIRED; if the entry is a leaf, synchronization is triggered and the entry placed in RECOVERY mode; otherwise, the entry is marked as EXPIRED and two child entries are created in the cache and placed in IDLE state. The expiry timers of both child entries are started. The update routine is triggered.

For any root entry present in the received message, if the received hash is different, the entry in the cache is placed in RECOVERY state, its two children are added to the cache in the IDLE state, and the expiry timers of the children are started. The update routine is triggered. When a leaf is synchronized, the corresponding cache entry is placed in EXPIRED state and the whole branch of the Merkle tree is updated from the newly synchronized leaf up to the root. If the cache only contains a root entry, the update routine is triggered. When an expiry timer expires, the corresponding entry is placed in EXPIRED state.

Figure 11:
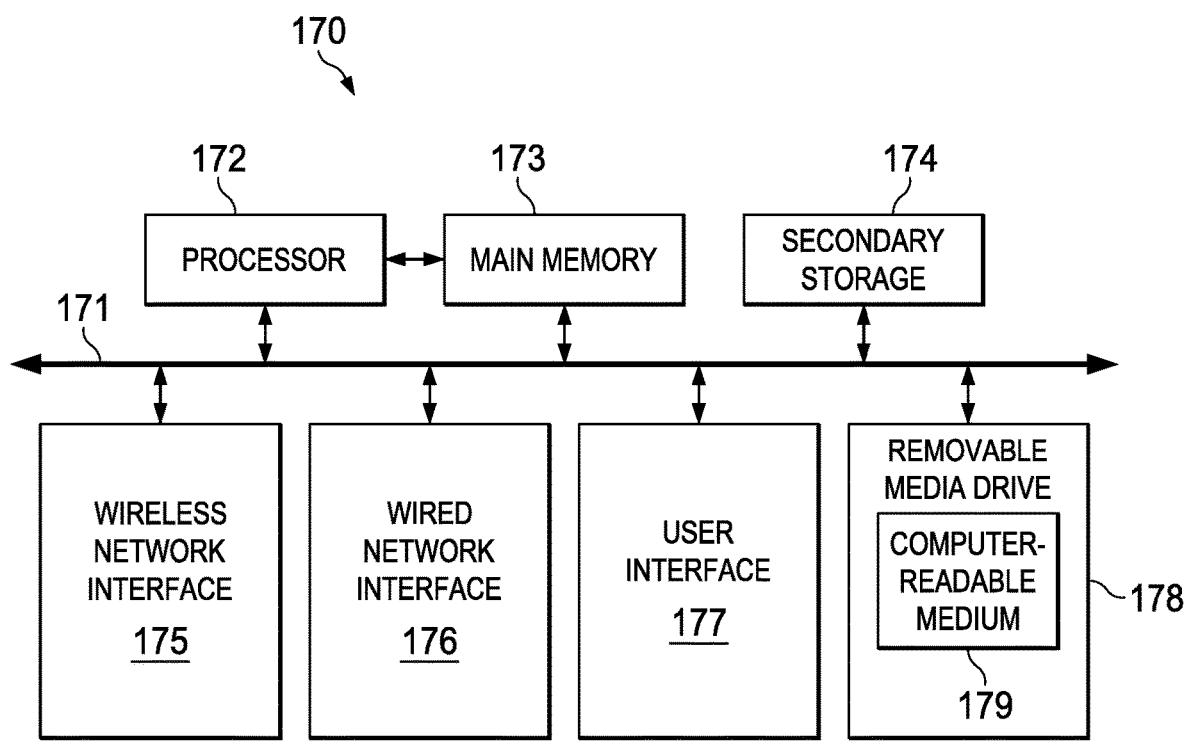
FIG. 11 is a simplified block diagram of a machine comprising an element of embodiments of an IPv6-based distributed storage space in accordance with features described herein.

Turning to FIG. 11, FIG. 11 is a simplified block diagram of an example machine (or apparatus) 130, which in certain embodiments may comprise devices 12, nodes of IP network 14, client 16, and/or distributed storage driver 18, in accordance with features of embodiments described herein. The example machine 130 corresponds to network elements and computing devices that may be deployed in system 10. In particular, FIG. 11 illustrates a block diagram representation of an example form of a machine within which software and hardware cause machine 130 to perform any one or more of the activities or operations discussed herein. As shown in FIG. 11, machine 130 may include a processor 132, a main memory 133, secondary storage 134, a wireless network interface 135, a wired network interface 136, a user interface 131, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines via networks. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 11 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine, may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in, for example, devices 12, nodes of IP network 14, client 16, and distributed storage driver 18. In some embodiments, this software could be received or downloaded from a web server, provided on computer-readable media, or configured by a manufacturer of a particular element in order to provide this system in accordance with features of embodiments described herein. In some embodiments, one or more of these features may be implemented in hardware, provided external to these elements, or consolidated in any appropriate manner to achieve the intended functionality.

In one example implementation, the system and architecture discussed herein includes network elements or computing devices, which may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

Furthermore, in the embodiments of the system and architecture described and shown herein, processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of the system and architecture may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by system 10 could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system as shown in the FIGURES and its teachings are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

In the foregoing description, for purposes of explanation, numerous specific details are set forth in order to provide a thorough understanding of the disclosed embodiments. It will be apparent to one skilled in the art, however, that the disclosed embodiments may be practiced without these specific details. In other instances, structure and devices are shown in block diagram form in order to avoid obscuring the disclosed embodiments. In addition, references in the Specification to "one embodiment", "example embodiment", "an embodiment", "another embodiment", "some embodiments", "various embodiments", "other embodiments", "alternative embodiment", etc. are intended to mean that any features (e.g., elements, structures, modules, components, steps, operations, characteristics, etc.) associated with such embodiments are included in one or more embodiments of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    for each of a plurality of data storage units collectively comprising a virtual storage unit, generating a mapping between an internal address of a respective one of the plurality of data storage units to a unique IP address, each of the plurality of data storage units including a block of storage on one of a plurality of physical storage devices, and the unique IP address including a virtual storage unit number identifying the virtual storage unit;
    receiving a request to perform a read/write operation on at least one of the plurality of data storage units, the request identifying the internal address of the at least one of the plurality of data storage units;
    translating, via the mapping, the internal address of the at least one of the plurality of data storage units to the unique IP address of the at least one of the plurality of data storage units; and
    performing a read operation or a write operation based on the request to perform the read/write operation, the read operation or the write operation performed in parallel on the plurality of data storage units.

2. The method of claim 1, wherein an IP prefix comprising a plurality of most significant bits ("MSBs") of each of the IP addresses identifies a storage domain of the plurality of data storage units.

3. The method of claim 2, wherein a plurality of least significant bits ("LSBs") of each of the IP addresses comprises a storage address space defining a storage space comprising the plurality of data storage units.

4. The method of claim 3, wherein a plurality of MSBs of the storage address space comprises the virtual storage unit number.

5. The method of claim 4, wherein the virtual storage unit number and the IP prefix collectively comprise a virtual unit prefix.

6. The method of claim 3, wherein a plurality of LSBs of the storage address space comprises a unit address space comprising an address of an associated data storage unit of the plurality of data storage units.

7. The method of claim 3, wherein the storage address space includes an m-bit replication factor for enabling $2^m$ replicas.

8. The method of claim 7, wherein the read/write operation is the read operation, the method further comprising:
    sending a get timestamps request to each of the replicas, the get timestamps request including a number of requested blocks;
    receiving a get timestamps reply containing a number of returned timestamps;
    if the get timestamps reply contains fewer than the number of requested blocks, sending another get timestamps request to a first block for which a timestamp has not been received;
    upon receipt of the number of requested blocks, sending a get data request to a replica with a most recent timestamp, the get data request including the number of requested blocks; and
    receiving a get data reply that contains data from the requested blocks.

9. The method of claim 7, wherein the read/write operation is the write operation, the method further comprising:
    sending a set blocks request to all of the replicas in parallel, the set blocks request including a number of blocks to write and a timestamp associated with each block to write; and
    receiving a set blocks reply from one of the replicas, wherein,
        the write operation is complete when a quorum of the replicas is updated.

10. One or more non-transitory tangible media having encoded thereon logic that includes code for execution and when executed by a processor is operable to perform operations comprising:

for each of a plurality of data storage units collectively comprising a virtual storage unit, generating a mapping between an internal address of a respective one of the plurality of data storage units to a unique IP address, each of the plurality of data storage units including a block of storage on one of a plurality of physical storage devices, and the unique IP address including a virtual storage unit number identifying the virtual storage unit;

receiving a request to perform a read/write operation on at least one of the plurality of data storage units, the request identifying the internal address of the at least one of the plurality of data storage units;

translating, via the mapping, the internal address of the at least one of the plurality of data storage units to the unique IP address of the at least one of the plurality of data storage units; and performing a read operation or a write operation based on the request to perform the read/write operation, the read operation or the write operation performed in parallel on the plurality of data storage units.

11. The media of claim 10, wherein an IP prefix comprising a plurality of most significant bits ("MSBs") of each of the IP addresses identifies a storage domain of the plurality of data storage units.

12. The media of claim 11, wherein a plurality of least significant bits ("LSBs") of each of the IP addresses comprises a storage address space defining a storage space comprising the plurality of data storage units.

13. The media of claim 12,
wherein,
a plurality of MSBs of the storage address space comprises the virtual storage unit number, and
the virtual storage unit number and the IP prefix collectively comprise a virtual unit prefix.

14. The media of claim 12,
wherein,
a plurality of LSBs of the storage address space comprises a unit address space comprising an address of an associated data storage unit of the plurality of data storage units, and
the storage address space includes an m-bit replication factor for enabling 2m replicas.

15. An apparatus comprising:
a memory element configured to store data;
a processor operable to execute instructions associated with the data; and
a virtual unit network driver configured to:
for each of a plurality of data storage units collectively comprising a virtual storage unit, generating a map between internal address of a respective one of the plurality of data storage units to a unique IP address, each of the plurality of data storage units including a block of storage on one of a plurality of physical storage devices, and the unique IP address including a virtual storage unit number identifying the virtual storage unit;
receive a request to perform a read/write operation on at least one of the plurality of data storage units, the request identifying the internal address of the at least one of the plurality of data storage units;
translate, via the map, the internal address of the at least one of the plurality of data storage units to the unique IP address of the at least one of the plurality of data storage units; and
perform a read operation or a write operation based on the request to perform the read/write operation, the read operation or the write operation performed in parallel on the plurality of data storage units.

16. The apparatus of claim 15, wherein an IP prefix comprising a plurality of most significant bits ("MSBs") of each of the IP addresses identifies a storage domain of the plurality of data storage units.

17. The apparatus of claim 16, wherein a plurality of least significant bits ("LSBs") of each of the IP addresses comprises a storage address space defining a storage space comprising the plurality of data storage units.

18. The apparatus of claim 17, wherein a plurality of MSBs of the storage address space comprises the virtual storage unit number.

19. The apparatus of claim 18, wherein the virtual storage unit number and the IP prefix collectively comprise a virtual unit prefix.

20. The apparatus of claim 17, wherein a plurality of LSBs of the storage address space comprises a unit address space comprising an address of an associated data storage unit of the plurality of data storage units.

* * * * *